(12) United States Patent
Kempa et al.

(10) Patent No.: US 7,649,665 B2
(45) Date of Patent: Jan. 19, 2010

(54) APPARATUS AND METHODS FOR OPTICAL SWITCHING USING NANOSCALE OPTICS

(75) Inventors: Krzysztof J. Kempa, Billerica, MA (US); Zhifeng Ren, Newton, MA (US); Michael J. Naughton, Norwood, MA (US); Jakub A. Rybczynski, Cambridge, MA (US)

(73) Assignee: The Trustees of Boston College, Chestnut Hill, MA (US)

( * ) Notice: Subject to any disclaimer, the term of this patent is extended or adjusted under 35 U.S.C. 154(b) by 539 days.

(21) Appl. No.: 11/509,398

(22) Filed: Aug. 24, 2006

(65) Prior Publication Data

US 2007/0081242 A1 Apr. 12, 2007

Related U.S. Application Data

(60) Provisional application No. 60/710,948, filed on Aug. 24, 2005, provisional application No. 60/799,293, filed on May 9, 2006.

(51) Int. Cl.
G02F 1/03 (2006.01)
G02F 1/29 (2006.01)
G02F 1/01 (2006.01)

(52) U.S. Cl. ............... 359/245; 359/279; 359/315; 359/320; 257/621; 136/244; 250/214.1

(58) Field of Classification Search ......... 359/245, 359/247, 248, 237, 321, 322; 257/9, 12, 257/213, 321, 401, 532, 621, 698, 774; 136/243–265; 977/742, 834; 252/501.1, 507, 511; 235/492; 250/214.1, 216, 234; 310/308; 342/21

See application file for complete search history.

(56) References Cited

U.S. PATENT DOCUMENTS

| 3,312,870 A | 4/1967 | Rhoades |
| 3,711,848 A | 1/1973 | Martens ............... 340/280 |
| 3,990,914 A | 11/1976 | Weinstein et al. ......... 136/89 |
| 4,105,470 A | 8/1978 | Skotheim ............ 136/89 SJ |
| 4,197,142 A | 4/1980 | Bolton et al. .......... 136/89 SJ |

(Continued)

FOREIGN PATENT DOCUMENTS

EP 1507298 2/2005

(Continued)

OTHER PUBLICATIONS

PCT International Search Report based on PCT/US06/33047 dated Mar. 17, 2008.

(Continued)

*Primary Examiner*—Loha Ben
(74) *Attorney, Agent, or Firm*—Greenberg Traurig, LLP; David J. Dykeman; Danielle T. Abramson

(57) ABSTRACT

An apparatus and methods for optical switching using nanoscale optics are disclosed herein. A nano-optics apparatus for use as an optical switch includes a metallic film having a top surface, a bottom surface and a plurality of cylindrical channels containing a dielectric material, the metallic film acting as an outer electrode; and an array of non-linear optical components penetrating the metallic film through the plurality of cylindrical channels, the array acting as an array of inner electrodes.

20 Claims, 9 Drawing Sheets

U.S. PATENT DOCUMENTS

| | | | |
|---|---|---|---|
| 4,360,703 A | 11/1982 | Bolton et al. | 136/263 |
| 4,445,050 A | 4/1984 | Marks | 307/145 |
| 4,445,080 A | 4/1984 | Curtiss | 318/798 |
| 4,774,554 A | 9/1988 | Dentai et al. | 357/17 |
| 4,783,605 A | 11/1988 | Tomisawa et al. | 307/450 |
| 4,803,688 A | 2/1989 | Lawandy | 372/21 |
| 4,854,876 A | 8/1989 | Heath et al. | 434/29 |
| 4,886,555 A | 12/1989 | Hackstein et al. | 136/255 |
| 4,913,744 A | 4/1990 | Hoegl et al. | 136/244 |
| 5,009,958 A | 4/1991 | Yamashita et al. | 428/411.1 |
| 5,023,139 A * | 6/1991 | Birnboim et al. | 428/402 |
| 5,028,109 A | 7/1991 | Lawandy | 350/96.12 |
| 5,084,365 A | 1/1992 | Gratzel et al. | 429/111 |
| 5,105,305 A | 4/1992 | Betzig et al. | 359/368 |
| 5,157,674 A | 10/1992 | Lawandy | 372/22 |
| 5,171,373 A | 12/1992 | Hebard et al. | 136/252 |
| 5,185,208 A | 2/1993 | Yamashita et al. | 428/411.1 |
| 5,211,762 A | 5/1993 | Isoda et al. | 136/263 |
| 5,233,621 A | 8/1993 | Lawandy | 372/22 |
| 5,250,378 A | 10/1993 | Wang | 430/83 |
| 5,253,258 A | 10/1993 | Lawandy | 372/22 |
| 5,264,048 A | 11/1993 | Yoshikawa et al. | 136/263 |
| 5,267,336 A | 11/1993 | Sriram et al. | 385/2 |
| 5,272,330 A | 12/1993 | Betzig et al. | 250/216 |
| 5,291,012 A | 3/1994 | Shimizu et al. | 250/216 |
| 5,331,183 A | 7/1994 | Sariciftci et al. | 257/40 |
| 5,332,910 A | 7/1994 | Haraguchi et al. | 257/13 |
| 5,333,000 A | 7/1994 | Hietala et al. | 342/368 |
| 5,360,764 A | 11/1994 | Celotta et al. | 437/173 |
| 5,380,410 A | 1/1995 | Sawaki et al. | 204/130 |
| 5,383,038 A | 1/1995 | Lawandy | 359/7 |
| 5,434,878 A | 7/1995 | Lawandy | 372/43 |
| 5,437,736 A | 8/1995 | Cole | 136/259 |
| 5,448,582 A | 9/1995 | Lawandy | 372/42 |
| 5,479,432 A | 12/1995 | Lawandy | 372/102 |
| 5,481,630 A | 1/1996 | Lawandy | 385/16 |
| 5,489,774 A | 2/1996 | Akamine et al. | 250/234 |
| 5,493,628 A | 2/1996 | Lawandy | 385/122 |
| 5,524,011 A | 6/1996 | Lawandy | 372/22 |
| 5,547,705 A | 8/1996 | Fukuzawa et al. | 427/162 |
| 5,548,113 A | 8/1996 | Goldberg et al. | 250/234 |
| 5,585,962 A | 12/1996 | Dixon | 359/328 |
| 5,589,235 A | 12/1996 | Ogawa | 428/1 |
| 5,604,635 A | 2/1997 | Lawandy | 359/620 |
| 5,625,456 A | 4/1997 | Lawandy | 356/376 |
| 5,689,603 A | 11/1997 | Huth | 385/131 |
| 5,694,498 A | 12/1997 | Manasson et al. | 385/15 |
| 5,747,861 A | 5/1998 | Dentai | 257/435 |
| 5,789,742 A | 8/1998 | Wolff | 250/227.11 |
| 5,796,506 A | 8/1998 | Tsai | 359/191 |
| 5,862,286 A | 1/1999 | Imanishi et al. | 385/122 |
| 5,872,422 A | 2/1999 | Xu et al. | 313/311 |
| 5,888,371 A | 3/1999 | Quate | 205/122 |
| 5,894,122 A | 4/1999 | Tomita | 250/234 |
| 5,897,945 A | 4/1999 | Lieber et al. | 428/323 |
| 5,902,416 A | 5/1999 | Kern et al. | 136/244 |
| 5,973,444 A | 10/1999 | Xu et al. | 313/309 |
| 5,994,691 A | 11/1999 | Konada | 250/234 |
| 6,038,060 A | 3/2000 | Crowley | 359/328 |
| 6,043,496 A | 3/2000 | Tennant | 250/492.1 |
| 6,052,238 A | 4/2000 | Ebbesen et al. | 359/738 |
| 6,083,843 A | 7/2000 | Ohja et al. | 438/710 |
| 6,096,496 A | 8/2000 | Frankel | 435/4 |
| 6,100,525 A | 8/2000 | Eden | 250/338.1 |
| 6,146,227 A | 11/2000 | Mancevski | 445/24 |
| 6,183,714 B1 | 2/2001 | Smalley et al. | 423/447.3 |
| 6,194,711 B1 | 2/2001 | Tomita | 250/234 |
| 6,201,242 B1 | 3/2001 | Eden et al. | 250/332 |
| 6,211,532 B1 | 4/2001 | Yagi | 257/40 |
| 6,212,292 B1 | 4/2001 | Soares | 382/141 |
| 6,233,045 B1 | 5/2001 | Suni et al. | 356/28.5 |
| 6,258,401 B1 | 7/2001 | Crowley | 427/126.3 |
| 6,271,130 B1 | 8/2001 | Rajh et al. | 438/677 |
| 6,278,231 B1 | 8/2001 | Iwasaki et al. | 313/310 |
| 6,283,812 B1 * | 9/2001 | Jin et al. | 445/24 |
| 6,310,583 B1 | 10/2001 | Saunders | 343/786 |
| 6,322,938 B1 | 11/2001 | Cohn | 430/8 |
| 6,365,466 B1 | 4/2002 | Krivokapic | 438/283 |
| 6,410,935 B1 | 6/2002 | Rajh et al. | 257/43 |
| 6,415,082 B1 | 7/2002 | Wach | 385/39 |
| 6,445,006 B1 | 9/2002 | Brandes et al. | 257/76 |
| 6,456,423 B1 | 9/2002 | Nayfeh et al. | 359/328 |
| 6,472,594 B1 | 10/2002 | Ichinose et al. | 136/256 |
| 6,504,292 B1 * | 1/2003 | Choi et al. | 313/310 |
| 6,514,771 B1 | 2/2003 | Seul | 436/518 |
| 6,515,274 B1 | 2/2003 | Moskovits et al. | 250/216 |
| 6,515,325 B1 | 2/2003 | Farnworth et al. | 27/108 |
| 6,699,642 B2 | 3/2003 | Chung et al. | 430/313 |
| 6,569,575 B1 | 5/2003 | Biebuyck et al. | 430/5 |
| 6,621,079 B1 | 9/2003 | Shao et al. | 250/306 |
| 6,642,129 B2 | 11/2003 | Liu et al. | 438/496 |
| 6,700,550 B2 | 3/2004 | Crowley | 343/792.5 |
| 6,724,064 B2 | 4/2004 | Watanabe et al. | 257/459 |
| 6,741,019 B1 * | 5/2004 | Filas et al. | 313/355 |
| 6,749,827 B2 | 6/2004 | Smalley et al. | 423/447.3 |
| 6,756,025 B2 | 6/2004 | Colbert et al. | 423/447.3 |
| 6,782,154 B2 | 8/2004 | Zhao et al. | 385/16 |
| 6,806,996 B2 | 10/2004 | Tatsuura et al. | 26/8 |
| 6,824,755 B2 | 11/2004 | Colbert et al. | 423/447.1 |
| 6,833,162 B2 | 12/2004 | Chattopadhyay et al. | 427/273 |
| 6,835,534 B2 | 12/2004 | Weiss et al. | 430/311 |
| 6,864,162 B2 * | 3/2005 | Jin | 438/551 |
| 6,867,443 B2 | 3/2005 | Liu et al. | 257/226 |
| 6,882,051 B2 | 4/2005 | Majumdar et al. | 257/746 |
| 6,891,623 B1 | 5/2005 | Baudon et al. | 356/491 |
| 6,897,158 B2 | 5/2005 | Sharma | 438/713 |
| 6,913,713 B2 | 7/2005 | Chittibabu et al. | 252/501.1 |
| 6,936,233 B2 | 8/2005 | Smalley et al. | 423/447.1 |
| 6,949,237 B2 | 9/2005 | Smalley et al. | 423/447.3 |
| 6,969,897 B2 | 11/2005 | Kim, II | 257/432 |
| 6,979,709 B2 | 12/2005 | Smalley et al. | 524/495 |
| 6,985,223 B2 | 1/2006 | Drachev et al. | 356/301 |
| 6,996,147 B2 | 2/2006 | Majumdar et al. | 372/43 |
| 7,005,378 B2 | 2/2006 | Crocker, Jr. et al. | 438/674 |
| 7,008,604 B2 | 3/2006 | Smalley et al. | 423/447.1 |
| 7,013,708 B1 | 3/2006 | Cho et al. | 73/31.05 |
| 7,035,498 B2 | 4/2006 | Wu et al. | 385/16 |
| 7,041,620 B2 | 5/2006 | Smalley et al. | 502/182 |
| 7,048,903 B2 | 5/2006 | Colbert et al. | 423/447.1 |
| 7,048,999 B2 | 5/2006 | Smalley et al. | 428/367 |
| 7,052,666 B2 | 5/2006 | Colbert et al. | 423/447.1 |
| 7,053,351 B2 | 5/2006 | Li et al. | 250/201.3 |
| 7,057,832 B2 | 6/2006 | Wu et al. | 359/811 |
| 7,060,510 B2 | 6/2006 | Bonnell et al. | 438/3 |
| 7,067,098 B2 | 6/2006 | Colbert et al. | 423/447.1 |
| 7,071,406 B2 | 7/2006 | Smalley et al. | 136/252 |
| 7,097,820 B2 | 8/2006 | Colbert et al. | 423/447.2 |
| 7,115,864 B2 | 10/2006 | Colbert et al. | 250/306 |
| 7,126,183 B2 | 10/2006 | Forbes et al. | 257/314 |
| 7,126,207 B2 * | 10/2006 | Mosley et al. | 257/532 |
| 7,129,567 B2 | 10/2006 | Kirby et al. | 257/621 |
| 7,132,711 B2 | 11/2006 | Forbes et al. | 257/314 |
| 7,157,372 B1 * | 1/2007 | Trezza | 438/675 |
| 7,208,793 B2 | 4/2007 | Bhattacharyya | 257/314 |
| 7,385,262 B2 * | 6/2008 | O'Keeffe et al. | 257/401 |
| 7,473,943 B2 * | 1/2009 | Mostarshed et al. | 257/213 |
| 7,495,361 B2 * | 2/2009 | Brouillet et al. | 310/90 |
| 2001/0001681 A1 | 5/2001 | Zhang et al. | 427/508 |
| 2002/0102196 A1 | 8/2002 | Smalley et al. | 422/198 |
| 2002/0102201 A1 | 8/2002 | Colbert et al. | 423/445 R |
| 2002/0122873 A1 | 9/2002 | Mirkin et al. | 427/2.1 |
| 2002/0150524 A1 | 10/2002 | Smalley et al. | 422/198 |
| 2002/0159943 A1 | 10/2002 | Smalley et al. | 423/447.1 |
| 2003/0021967 A1 | 1/2003 | Sagiv et al. | 428/209 |

| | | | |
|---|---|---|---|
| 2003/0042487 A1 | 3/2003 | Sarychev et al. ............... 29/4 |
| 2003/0068432 A1 | 4/2003 | Dai et al. ..................... 427/58 |
| 2003/0134267 A1 | 7/2003 | Kang et al. ..................... 435/4 |
| 2003/0213922 A1 | 11/2003 | Gordon et al. ............ 250/492.1 |
| 2004/0075464 A1 | 4/2004 | Samuelson et al. ............ 326/37 |
| 2004/0077156 A1 | 4/2004 | Tsakalakos et al. ......... 438/479 |
| 2004/0131843 A1 | 7/2004 | Mirkin et al. ............... 428/327 |
| 2004/0169615 A1 | 9/2004 | Crowley .................... 343/810 |
| 2004/0232321 A1 | 11/2004 | Miles et al. ................. 250/235 |
| 2004/0245209 A1 | 12/2004 | Jung et al. ..................... 216/8 |
| 2005/0181409 A1 | 8/2005 | Park et al. ..................... 435/6 |
| 2005/0189480 A1 | 9/2005 | Hollingsworth ............ 250/234 |
| 2005/0191434 A1 | 9/2005 | Mirin et al. ................. 427/457 |
| 2005/0194035 A1 | 9/2005 | Jin et al. ..................... 136/252 |
| 2005/0194038 A1 | 9/2005 | Brabec et al. ............... 136/256 |
| 2005/0199894 A1 | 9/2005 | Rinzler et al. ................. 257/94 |
| 2005/0211294 A1 | 9/2005 | Chittibabu et al. .......... 136/263 |
| 2005/0221202 A1 | 10/2005 | Gofron .......................... 430/5 |
| 2005/0221577 A1 | 10/2005 | Li et al. ...................... 438/401 |
| 2005/0230270 A1 | 10/2005 | Ren et al. ................. 205/777.5 |
| 2005/0243410 A1 | 11/2005 | Bachmann et al. .......... 359/342 |
| 2005/0255237 A1 | 11/2005 | Zhang et al. ................ 427/180 |
| 2005/0272856 A1 | 12/2005 | Cooper et al. ............... 254/496 |
| 2006/0014001 A1 | 1/2006 | Zhang et al. ............. 428/195.1 |
| 2006/0024438 A1 | 2/2006 | Ku et al. ..................... 427/237 |
| 2006/0027543 A1 | 2/2006 | Cheng ................... 219/121.69 |
| 2006/0040057 A1 | 2/2006 | Sheehan et al. ............. 427/256 |
| 2006/0043257 A1 | 3/2006 | Cheng et al. ............. 250/201.3 |
| 2006/0054922 A1 | 3/2006 | Pettit .......................... 257/116 |
| 2006/0082379 A1 | 4/2006 | Liu et al. .................... 324/754 |
| 2006/0110618 A1 | 5/2006 | Manivannan et al. ........ 428/566 |
| 2006/0158760 A1 | 7/2006 | Ambrosio et al. ........... 359/883 |
| 2007/0047056 A1 | 3/2007 | Kempa et al. ............... 359/245 |
| 2007/0081242 A1 | 4/2007 | Kempa et al. ............... 359/486 |
| 2007/0105240 A1 | 5/2007 | Kempa et al. .................. 438/3 |
| 2007/0107103 A1 | 5/2007 | Kempa et al. ............... 977/834 |
| 2007/0137697 A1 | 6/2007 | Kempa et al. ............... 136/256 |
| 2007/0138376 A1 | 6/2007 | Naughton et al. ........... 250/216 |
| 2007/0240757 A1 | 10/2007 | Ren et al. .................... 136/256 |

FOREIGN PATENT DOCUMENTS

WO  WO 03/016901  2/2003

OTHER PUBLICATIONS

Liu, et al., Third-order optical nonlinearity of the carbon nanotubes, Applied Physics Letters, vol. 74, Issue 2 pp. 164-166, Jan. 1999.
Misewich et al, Electrically Induced Optical Emission from a Carbon Nanotube FET, Science. vol. 300. No. 5620, pp. 783-7862, May 2003.
Wang et al., Receiving and transmitting lightlike radio waves: Antenna effects in arrays of aligned carbon nanotubes, Applied Physics Letters vol. 85 No. 13 Sep. 2004.
Center for Multifunctional Polymer Nanomaterials and Devices (CMPND), "Polymer Photonics", (6 pages), © 2003 found at www.capce.ohio-state.edu/CMPND/Photonics.htm, accessed on Oct. 25, 2007.
Atwater et al., *The New "p-n. Junction": Plasmonics Enables Photonic Access to the Nanoworld*, MRS Bulletin, 30 (5), pp. 385-389, ISSN 0883-7694, May 2005.
Burns, G., *Solid State Physics*, Academic Press Inc., Orlando, pp. 487-489, 1985.
Delzeit et al., *Growth of Carbon Nanotubes by Thermal and Plasma Chemical Vapour Deposition Processes and Applications in Microscopy*, Nanotechnology, vol. 13, pp. 280-284, 2002.
Fumeaux et al., *Measurement of the Resonant Lengths of Infrared Dipole Antennas*, Infrared Physics and Technology, vol. 41, pp. 271-281, 2000.
Guo et al., *Metal-Insulator-Semiconductor Electrostatics of Carbon Nanotubes*, Applied Physics Letters, vol. 81, No. 8, pp. 1486-1488, Aug. 19, 2002.
Guo et al., *Performance Projections for Ballistic Carbon Nanotube Field-Effect Transistors*, Applied Physics Letters, vol. 80, No. 17, pp. 3192-3194, Apr. 29, 2002.
Heavens, O.S., *Optical Properties of Thin Solid Films*, Dover Publications, Inc., New York, pp. 113-116, 1955.
Huang et al., *Growth of Large Periodic Arrays of Carbon Nanotubes*, Applied Physics Letters, vol. 82, No. 3, pp. 460-462, Jan. 20, 2003.
Jorio et al., *Polarized Resonant Raman Study of Isolated Single-Wall Carbon Nanotubes: Symmetry Selection Rules, Dipolar and Multipolar Antenna Effects*, Physical Review B, vol. 65, pp. 121402-1-121402-4, 2002.
Kayes et al., *Radial pn Junction Nanorod Solar Cells: Device Physics Principles and Routes to Fabrication in Silicon*, Photovoltaic Specialists Conference 2005, Conference Record of the Thirty-Fifth Proceedings of the IEEE, pp. 55-58, Jan. 3-7, 2005.
Kempa et al., *Photonic Crystals Based on Periodic Arrays of Aligned Carbon Nanotubes*, Nano Letters, vol. 3, No. 1, pp. 13-18, 2003.
Milanovic et al., *A Simple Process for Lateral Single Crystal Silicon Nanowires*, Proceedings of IMECE'02, 2002 ASME International Engineering Congress & Exposition, New Orleans, LA, IMCE 2002-33392, pp. 1-7, Nov. 17-22, 2002.
Moon et al., *Field Theory for Engineers*, D. Van Nostrand Company Inc., Princeton, NJ, pp. 504-509, 1961.
Ren et al., *Synthesis of Large Arrays of Well-Aligned Carbon Nanotubes on Glass*, Science, vol. 282, pp. 1105-1107, Nov. 6, 1998.
Sotiropoulou et al., *Carbon Nanotube Array-Based Biosensor*, Anal. Bioanal. Chem., vol. 375, pp. 103-105, 2003.
Staebler et al., *Reversible Conductivity Changes in Discharge-Produced Amorphous Si*, Applied Physics Letters, vol. 31, No. 4, pp. 292-294, 1977.
Teo et al., *Uniform Patterned Growth of Carbon Nanotubes Without Surface Carbon*, Applied Physics Letters, vol. 79, No. 10, pp. 1534-1536, Sep. 3, 2001.
Terman, F.E., *Radio Engineering*, McGraw-Hill Book Company, New York, Chapter 14, pp. 662-731, 1947.
von Roedern, B. et al., *The Role of Polycrystalline Thin-Film PV Technologies for Achieving Mid-Term Market Competitive PV Modules*, Conference Record of 31st IEEE Photovoltaics Specialists Conference and Exhibition, Lake Buena Vista, FL, Jan. 3-7, 2005.
Wang et al., *Receiving and transmitting Light-Like Radio Waves: Antenna Effect in Arrays of Aligned Carbon Nanotubes*, Applied Physics Letters, vol. 85, No. 13, pp. 2607-2609, Sep. 27, 2004.
Kayes, et al., *Comparison of the Device Physics Principles of Planar and Radial p-n. Junction Nanorod Solar Cells*, Journal of Applied Physics, 91(11), Art. No. 114302, pp. 114302-1 - 114302-11, May 23, 2005.

* cited by examiner

FIG. 1A
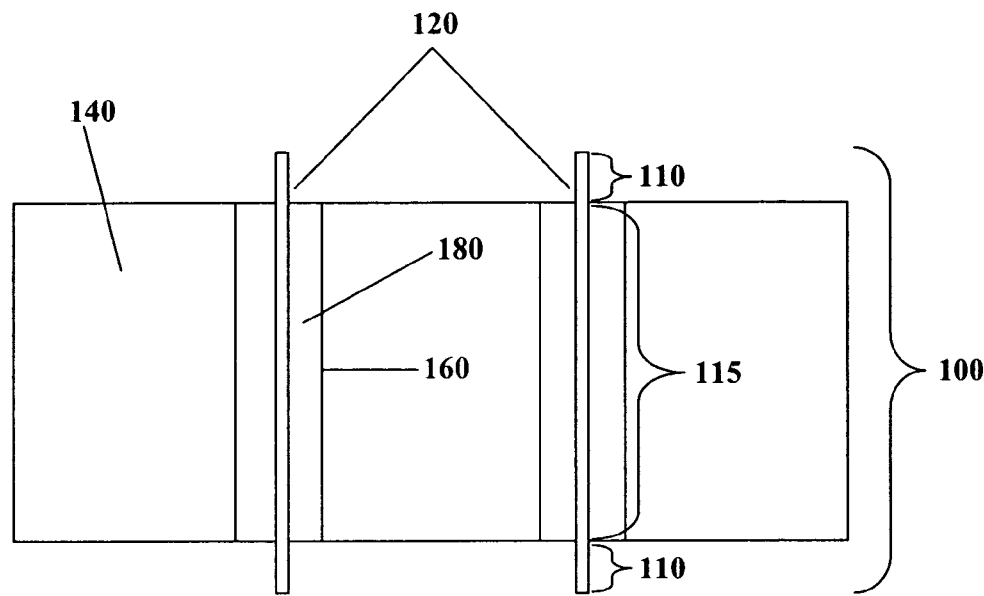
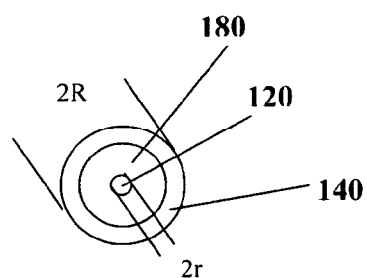
FIG. 1B

APPARATUS AND METHODS FOR OPTICAL SWITCHING USING NANOSCALE OPTICS

RELATED APPLICATIONS

This application claims the benefit of U.S. Provisional Application Ser. No. 60/710,948, filed Aug. 24, 2005 and U.S. Provisional Application Ser. No. 60/799,293, filed May 9, 2006, and the entirety of these applications are hereby incorporated herein by reference for the teachings therein.

GOVERNMENT SUPPORT

The invention was supported, in whole or in part, by Contract No. DAAD16-02-C-0037 from the U.S. Army Natick Soldier Systems Center. The Government has certain rights in the invention.

FIELD

The embodiments disclosed herein relate to the field of optics, and more particularly to an apparatus and methods for optical switching using nanoscale optics.

BACKGROUND

Nano-optics is the study of optical interactions with matter on a subwavelength scale. Nano-optics has numerous applications in optical technologies such as nanolithography, optical data storage, photochemistry on a nanometer scale, solar cells, materials imaging and surface modification with sub-wavelength lateral resolution, local linear and nonlinear spectroscopy of biological and solid-state structures, quantum computing, quantum communication and optical networking.

As telecommunication networks continue to expand and require greater bandwidth, it is necessary to introduce new technologies to keep up with growing demands. Telecommunication technologies should not only facilitate the need for bandwidth but also be easily incorporated into exiting network infrastructure. At the same time, the technology should be flexible and versatile enough to fit the requirements of the future. While current telecommunication systems include a combination of electronic and optical data-transmission, there is movement towards optical networks due to the increased bandwidth provided by high bit-rates and parallel transmission through wavelength division multiplexing.

Optical networks use light for much of the transmission of data between nodes in an optical circuit. Optical cross-connects function as switches in these nodes by routing signals arriving at one input-port to one of a variety of output-ports. Most current optical cross-connect systems comprise high-speed electronic cores, which are complex, cumbersome, and expensive. These switches typically require a light signal to be translated into an electronic signal, which is switched or routed to an output-port before being reconverted to a light signal. Such optical-to-electronic-to-optical (OEO) devices are typically the rate-limiting component in an optical network. As such, many options are being considered to reduce the need for both OEO conversions, as well as electronic-signal processing in optical network components.

The basic premise of optical switching is that by replacing existing electronic network switches with optical ones, the need for OEO conversions is removed. The advantages of being able to avoid the OEO conversion stage are significant. Optical switching should be more economical, as there is no need for expensive high-speed electronics. Removing the complexity should also make for physically smaller switches. However, optical switching technology is still in its infancy. Semiconductor amplifiers, liquid crystals, holographic crystals, and tiny mirrors have all been proposed to implement light switching between optical fibers.

Prior art optical network devices have utilized optical switch arrays. Prior art devices are described in U.S. Pat. No. 7,035,498 entitled "Ultra-Fast All-Optical Switch Array;" U.S. Pat. No. 7,060,510 entitled "Electronic and Optoelectronic Devices and Methods for Preparing Same;" U.S. Patent Application No. 20020176650 entitled "Ultrafast All-Optical Switch Using Carbon Nanotube Polymer Composites;" U.S. Patent Application No. 20050199894 entitled "Semiconductor Device and Method Using Nanotube Contacts;" U.S. Patent Application No. 20050243410 entitled "Optical Signal Processing Device and Non-Linear Optical Component;" U.S. Patent Application No. 20060054922 entitled "Optically Controlled Electrical Switching Device Based on Wide Bandgap Semiconductors;" and U.S. Patent Application No. 20060158760 entitled "Optically Controlled Electrical-Switch Device Based Upon Carbon Nanotubes and Electrical-Switch System Using the Switch Device," all of which are hereby incorporated by reference in their entireties for the teachings therein.

There is a need in the art for nanoscale optical networks fabricated from all-optical switches that are based on nonlinear optical materials. The all-optical switches would be easily integrated into existing and future network infrastructure, ultrafast, inexpensive and reduce the loss of bandwidth.

SUMMARY

An apparatus and methods for optical switching using nanoscale optics are disclosed herein.

According to aspects illustrated herein, there is provided a nano-optics apparatus for use as an optical switch that includes a metallic film having a top surface, a bottom surface and a plurality of cylindrical channels containing a dielectric material wherein the metallic film acts as an outer electrode; and an array of non-linear optical components penetrating the metallic film through the plurality of cylindrical channels wherein the array acts as an array of inner electrodes. In an embodiment, the array of non-linear optical components is an array of carbon nanotubes.

According to aspects illustrated herein, there is provided a method of optical switching including positioning an optical switch at a node in an optical circuit, wherein the optical switch comprises a metallic film having a plurality of cylindrical channels containing a dielectric material and an array of non-linear optical components penetrating the metallic film through the plurality of cylindrical channels; receiving an optical signal at a portion of each non-linear optical component that protrudes from a top surface of the metallic film; transmitting the optical signal from the portion that protrudes from the top surface of the metallic film to a portion of the non-linear optical component that is embedded within the metallic film such that the optical signal propagates through the non-linear optical component; receiving an optical signal at a portion of each non-linear optical component that protrudes from a bottom surface of the metallic film; transmitting the optical signal from the portion that protrudes from the bottom surface of the metallic film to the non-linear optical component embedded within the metallic film such that the optical signal propagates through the non-linear optical component, wherein the optical signal transmitted from the portion that protrudes from the bottom surface of the metallic film produces an electric field inside the embedded portion of the non-linear optical component that switches the optical signal coming from the portion of each non-linear optical component that protrudes from a top surface of the metallic film.

According to aspects illustrated herein, there is provided a method of fabricating an ultrafast optical switch including obtaining a substrate; coating the substrate with a chromium layer; electrodepositing a catalytic transition metal on the coated substrate; growing an array of non-linear optical components on the coated substrate; etching the chromium layer; coating the coated substrate and the array of non-linear optical components with a dielectric material; and coating the coated substrate and the array of non-linear optical components with a metal material.

BRIEF DESCRIPTION OF THE DRAWINGS

The presently disclosed embodiments will be further explained with reference to the attached drawings, wherein like structures are referred to by like numerals throughout the several views. The drawings are not necessarily to scale, the emphasis having instead been generally placed upon illustrating the principles of the presently disclosed embodiments.

FIG. 1A shows a schematic image of a nano-optics apparatus that includes an array of non-linear optical components, the array consists of portions that protrude from a metallic film, known as nano-optical antennas, and a portion that is embedded within the metallic film, known as a nano-coaxial transmission line. The nano-optics apparatus is synthesized in accordance with the presently disclosed embodiments.

FIG. 1B shows a cross-sectional view of the nano-coaxial transmission lines of FIG. 1A.

Figure 2A:
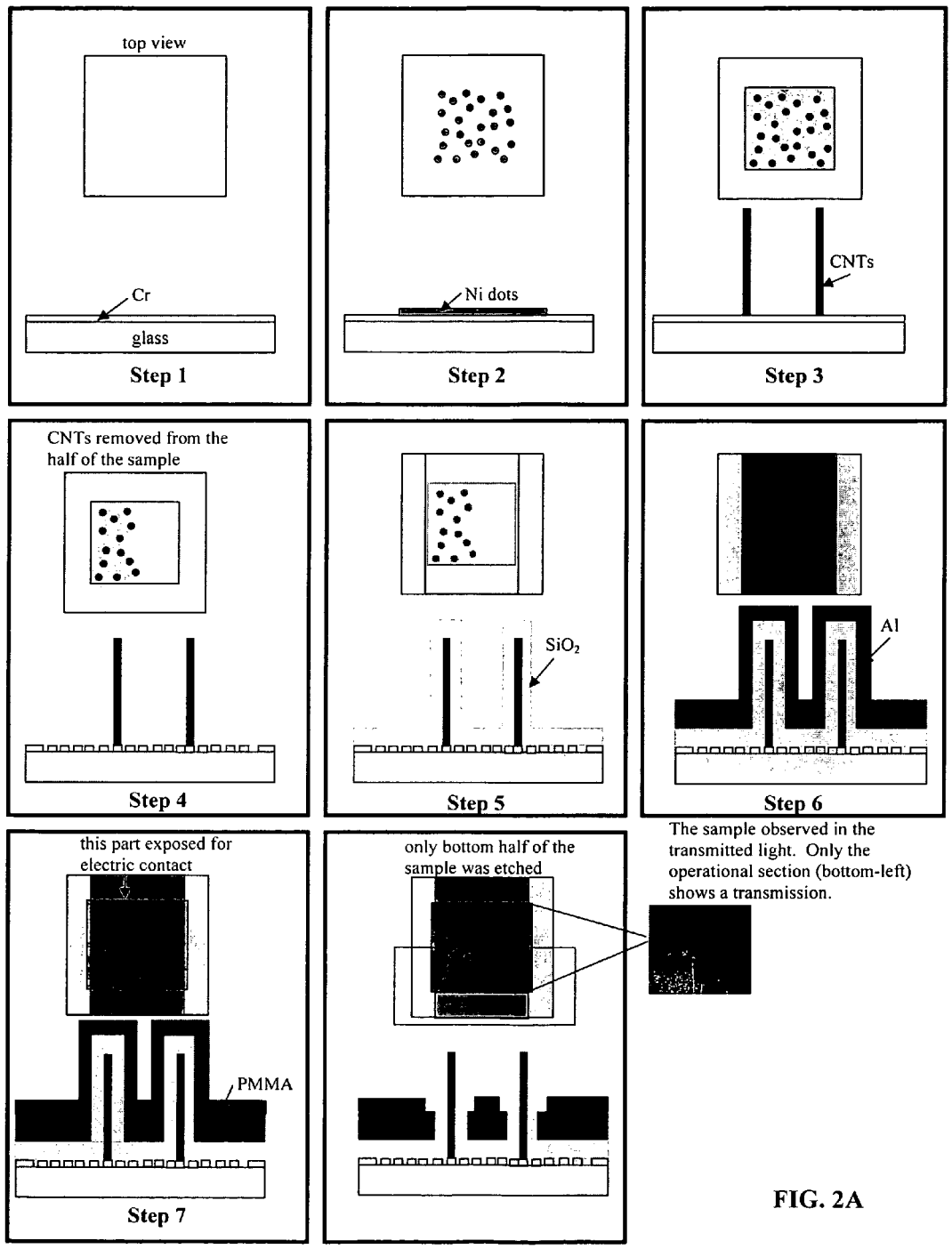
FIG. 2A shows the method steps for synthesizing a nano-optics apparatus in accordance with the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The embodiments disclosed herein relate to the field of nano-optics and more particularly to an apparatus and methods for optical switching using nanoscale optics and methods of fabricating ultrafast optical switches. The optical switches may be used in for optical networking. The following definitions are used to describe the various aspects and characteristics of the presently disclosed embodiments.

As referred to herein, "nano-optics" is the study of optical interactions with matter on a subwavelength scale, i.e., nanoscale optics.

As referred to herein, "carbon nanotube", "nanowire", and "nanorod" are used interchangeably.

As referred to herein, "nanoscale" refers to distances and features below about 5000 nanometers (one nanometer equals one billionth of a meter).

As referred to herein, "single-walled carbon nanotubes" (SWCNTs) include one graphene sheet rolled into a cylinder. "Double-walled carbon nanotubes" (DWCNTs) include two graphene sheets in parallel, and those with multiple sheets (typically about 3 to about 30) are "multi-walled carbon nanotubes" (MWCNTs).

As referred to herein, "single-core coaxial transmission lines" (SCCTL) include one nanotube at the center. A "double-core coaxial transmission lines" (DCCTL) include two nanotubes at the center.

As referred to herein, CNTs are "aligned" wherein the longitudinal axis of individual tubules are oriented in a plane substantially parallel to one another.

As referred to herein, a "tubule" is an individual CNT.

As referred to herein, "linear CNTs" are CNTs that do not contain any branches originating from the surface of individual CNT tubules along their linear axes.

As referred to herein, an "array" is a plurality of CNT tubules that are attached to a substrate material proximally to one another.

As referred to herein, a "nanoscale coaxial line" refers to a nanoscale coaxial wire, which includes a plurality of concentric layers. In an embodiment, the nanoscale coaxial line has three concentric layers: an internal conductor, a photovoltaic coating around the core, and an outer conductor. Transmission of electromagnetic energy inside the coaxial line is wavelength-independent and happens in transverse electromagnetic (TEM) mode. In an embodiment, the internal conductor is a metallic core. In an embodiment, the outer conductor is a metallic shielding.

As referred to herein, a "nanoscale coplanar line" refers to a nanoscale coplanar structure, which includes a plurality of parallel layers. In an embodiment, the nanoscale coplanar line has three parallel layers: two metallic conductors, with a photovoltaic coating between them. Transmission of electromagnetic energy inside the coplanar line is wavelength-independent and happens in transverse electromagnetic (TEM) mode.

As referred to herein, "transverse electromagnetic (TEM)" refers to an electromagnetic mode in a transmission line for which both the electric and magnetic fields are perpendicular to the direction of propagation. Other possible modes include but are not limited to transverse electric (TE), in which only the electric field is perpendicular to the direction of propagation, and transverse magnetic (TM), in which only the magnetic field is perpendicular to the direction of propagation.

As referred to herein, a "catalytic transition metal" can be any transition metal, transition metal alloy or mixture thereof. Examples of a catalytic transition metals include, but are not limited to, nickel (Ni), silver (Ag), gold (Au), platinum (Pt), palladium (Pd), iron (Fe), ruthenium (Ru), osmium (Os), cobalt (Co), rhodium (Rh) and iridium (Ir). In a embodiment, the catalytic transition metal comprises nickel (Ni).

As referred to herein, a "catalytic transition metal alloy" can be any transition metal alloy. Preferably, a catalytic transition metal alloy is a homogeneous mixture or solid solution of two or more transition metals. Examples of a catalytic transition metal alloy include, but are not limited to, a nickel/gold (Ni/Au) alloy and a cobalt/iron (Co/Fe) alloy.

The terms "nanotubes," "nanowires," "nanorods," "nanocrystals," "nanoparticles" and "nanostructures" are employed interchangeably herein. These terms primarily refer to material structures having sizes, e.g., characterized by their largest dimension, in a range of a few nanometers (nm) to about a few microns. In applications where highly symmetric structures are generated, the sizes (largest dimensions) can be as large as tens of microns.

As referred to herein, "CVD" refers to chemical vapor deposition. In CVD, gaseous mixtures of chemicals are dissociated at high temperature (for example, $CO_2$ into C and $O_2$). This is the "CV" part of CVD. Some of the liberated molecules may then be deposited on a nearby substrate (the "D" in CVD), with the rest pumped away. Examples of CVD methods include but not limited to, "plasma enhanced chemical vapor deposition" (PECVD), and "hot filament chemical vapor deposition" (HFCVD).

As referred to herein, an "optical signal" refers to any electromagnetic radiation pulse including gamma rays, X-rays, ultraviolet light, visible light, infrared, microwaves, radio waves (ULF, VLF, LF, MF, HF, long, short, HAM, VHF, UHF, SHF, EHF), cosmic microwave background radiation and other forms of radiation of the electromagnetic spectrum.

An optical switch is a switch that enables signals in optical fibers or integrated optical circuits (IOCs) to be selectively switched from one circuit to another. An all optical switch is a device that allows one optical signal to control another optical signal, i.e. control of light by light. In an all-optical switch, both the input/output modules and the backplane are optical. All-optical switching enables the signal to be routed with universal interfaces capable of handling virtually any audio and video signal, whether analog or digital. In all-optical switching technology, optical signals passing through a switch are diverted to the appropriate destination without being converted to electronic signals. The various all-optical switching technologies that currently support such systems include electromechanical switches (e.g., micro-electro-mechanical systems (MEMS) or bulk optics), thermo-optic switches (e.g., phase shift, capillary, or bubble), and electro-optic switches (e.g., $LiNbO_3$ or liquid crystal). In addition, a variety of nonlinear optical switches (e.g., semiconductor optical amplifiers) use a light beam, rather than electronics, to operate the switch.

In a nonlinear material, a light beam of sufficient strength changes the optical properties of the material which in turn affects any beams of light also propagating through the material. Therefore one beam applied to the material can control the interaction between the material and another beam. As a result, one beam can cause another beam to change direction. Materials possessing large optical nonlinearities are desirable for applications such as optical switching. The optical nonlinearities of most materials are much smaller than that needed for practical devices, motivating the search for new materials. Inorganic semiconductor particles containing a few thousand atoms, known as semiconductor nanocrystals, as well as carbon nanotubes, have greatly enhanced nonlinear optical properties compared to their bulk counterparts.

Carbon nanotubes have unique mechanical and electronic characteristics, which make them suitable for nanomechanical and nanoelectromechanical applications, in particular nanoscale electronics. The optical behavior of carbon nanotubes shows distinct non-linear optical effects, making carbon nanotubes useful for applications such as all-optical switching.

The presently disclosed embodiments generally relate to the use of non-linear optical components to fabricate a nano-optics apparatus. The nano-optics apparatus is a multifunctional nano-composite material made of a metallic film (that acts as an outer electrode) having a top surface and a bottom surface and a plurality of cylindrical channels filled with a dielectric material. An array of non-linear optical components (that act as an inner electrode) penetrate the metallic film through the plurality of cylindrical channels. The array of non-linear optical components have protruding portions that extend beyond a surface of the metallic film and an embedded portion that is within the metallic film. The protruding portions act as nano-optical antenna and are capable of receiving (collecting) and transmitting an optical signal. The embedded portion acts as a nano-coaxial transmission line (CTL) (or rectifying element) and converts the energy trapped in currents along the nano-optical antenna into a manageable signal and allows for propagation of the optical signal (external radiation) with a wavelength exceeding the perpendicular dimensions of the non-linear optical components. In an embodiment, the non-linear-optical components are carbon nanotubes. In an embodiment, the nano-optics apparatus is used as an ultrafast optical switch.

The nano-optics apparatus can concentrate light, and therefore enhance a field up to about $10^3$ times. The array of non-linear optical components, with nano-CTL embedded in a metallic film, effectively compresses an optical signal (light) into nanoscopic dimensions. The nano-optical antennas are capable of receiving and transmitting an optical signal. The extreme compression of light in the nano-CTL leads to an asymmetric tunneling of electrons between the electrodes of the apparatus, and thus provides a rectifying action at the light frequencies, and thus conversion of the light into a direct current (DC) voltage. The extreme compression of light in the nano-CTL is quick, and is not limited by the usual parasitic capacitances that make the conventional diode rectification inefficient, if not impossible, at the light frequencies.

The nano-optical antennas described herein possess the directional characteristics of conventional antennas, proving that conventional, radio technology applies to nano-optics systems in the visible frequency range.

FIG. 1A shows a schematic image of a nano-optics apparatus 100 synthesized in accordance with the presently disclosed embodiments. The nano-optics apparatus 100 has an array of non-linear optical components 120 (that act as inner electrodes) that penetrate a metallic film 140 (that act as an outer electrode) through cylindrical channels 160 filled with a dielectric material 180. Each non-linear optical component 120 has ends that act as nano-optical antennas 110 that protrude from each surface of the metallic film, and a nano-coaxial transmission line (nano-CTL) 115 that is embedded within the metallic film. In this embodiment, each nano-optical antenna 110 couples to an optical signal (external radiation) from both nano-optical antenna 110 ends, either via receivers (dipole antenna via inner conductor extension, or receivers), or coaxial couplers. Such thin film 140 is transparent, as each nano-optical antenna 110 mediates partial spherical waves, one-by-one (thus the term "discrete optics"). In an embodiment, the non-linear optical components are carbon nanotubes.

FIG. 1B shows a cross-sectional view of the non-linear optical components 120. In FIG. 1B, the diameter of the non-linear optical component 120 is defined as 2 r while the diameter of the cylindrical channels 160 is 2 R. Those skilled in the art will recognize that the diameters can vary and be within the spirit and scope of the presently disclosed embodiments.

FIG. 2A shows an exemplary method for synthesizing a nano-optics apparatus of the presently disclosed embodiments. In step 1, chromium is sputtered onto a glass substrate, typically at a thickness of about 15 nm. A selected thickness of catalytic transition metal (for example nickel) is electrodeposited onto the chromium glass followed by carbon nanotube growth, as shown in steps 2 and 3. Plasma enhanced chemical vapor deposition (PECVD) is used to etch the chromium layer, as shown in step 4. Typical PECVD lasts about an hour. A dielectric (or semiconductor) material (for example $SiO_x$, where $0 \leq x \leq 2$) is sputtered on the substrate, as shown in step 5. Those skilled in the art will recognize that the sputtered material may be made of any material having a specific function as required by an application of the nano-optics apparatus and still be within the scope and spirit of the presently disclosed embodiments. Typically, the dielectric material is coated to yield a thickness of about 100 nm. Aluminum is then sputtered followed by spin-coating of polymethylmethacrylate (PMMA) and baking at about 180° C. for about 40 minutes, as shown in steps 6 and 7. Typically, about 400 nm of aluminum is sputtered. In step 8, electrochemical etching of the aluminum layer on the tips of the nanorods is accomplished at about 25 minutes in about 20% $H_2SO_4$, 4.0V, sample as anode, a platinum electrode as cathode. In this example, only the bottom half of the sample was etched, resulting in just that portion having transmitted light, as seen in the transmission electron microscopy image.

Figure 2B:
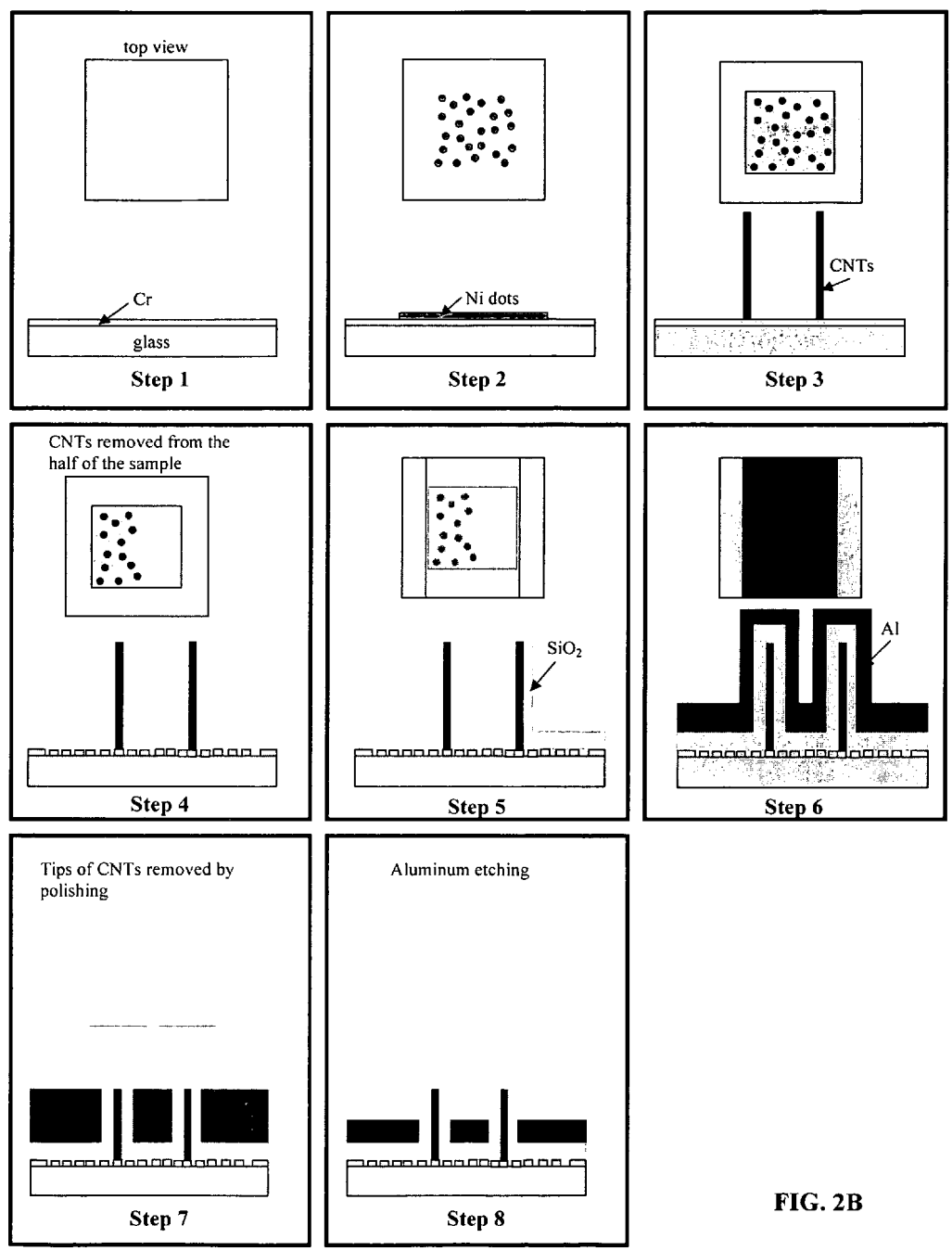
FIG. 2B shows the method steps for synthesizing a nano-optics apparatus in accordance with the presently disclosed embodiments.

FIG. 2B shows an alternative method for synthesizing a nano-optics apparatus of the presently disclosed embodiments. In step 1, chromium is sputtered onto a glass substrate, typically at a thickness of about 15 nm. A selected thickness of catalytic transition metal (for example nickel) is electrodeposited onto the chromium glass followed by carbon nanotube growth, as shown in steps 2 and 3. Plasma enhanced chemical vapor deposition (PECVD) is used to etch the chromium layer, as shown in step 4. Typical PECVD lasts about an hour. A dielectric (or semiconductor) material (for example $SiO_x$, where $0 \leq x \leq 2$) is sputtered on the substrate, as shown in step 5. Those skilled in the art will recognize that the sputtered material may be made of any material having a specific function as required by an application of the nano-optics apparatus and still be within the scope and spirit of the presently disclosed embodiments. Typically, the dielectric material is coated to yield a thickness of about 100 nm. Aluminum is then sputtered onto the coated substrate, as shown in step 6. Typically, about 400 nm of aluminum is sputtered. In step 7, the tips of the nanotubes are removed by polishing. In step 8, electrochemical etching of the aluminum layer on the tips of the nanorods is accomplished at about 25 minutes in about 20% $H_2SO_4$, 4.0V, with the sample as anode, and a platinum electrode as cathode.

Figure 3:
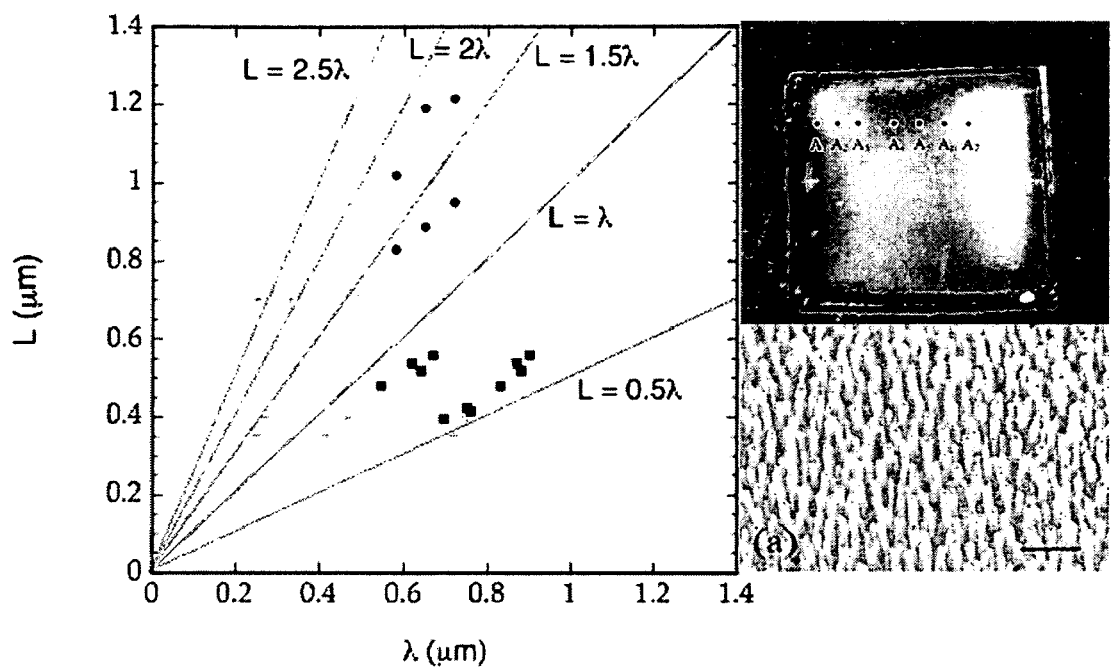
FIG. 3 shows a graph of antenna length versus radiation wavelength, at a maximum radar cross section (RCS) scattering amplitude.

FIG. 3 shows results demonstrating the antenna action of an array of carbon nanotubes in the visible frequency range. Both the polarization, as well as, the antenna length effects, are shown in the radar cross section (RCS) type of experiment, in which an external radiation is reflected/scattered by an aperiodic array of carbon nanotubes, in excellent agreement with the antenna theory. The main section shows the antenna length versus radiation wavelength, at a maximum RCS scattering amplitude. The upper right image in FIG. 3 shows an image of the sample with interference colors (from left to right) due to gradually changing antenna length. The lower right image in FIG. 3 shows the scanning electron microscope image of the carbon nanotubes.

Figure 4A:
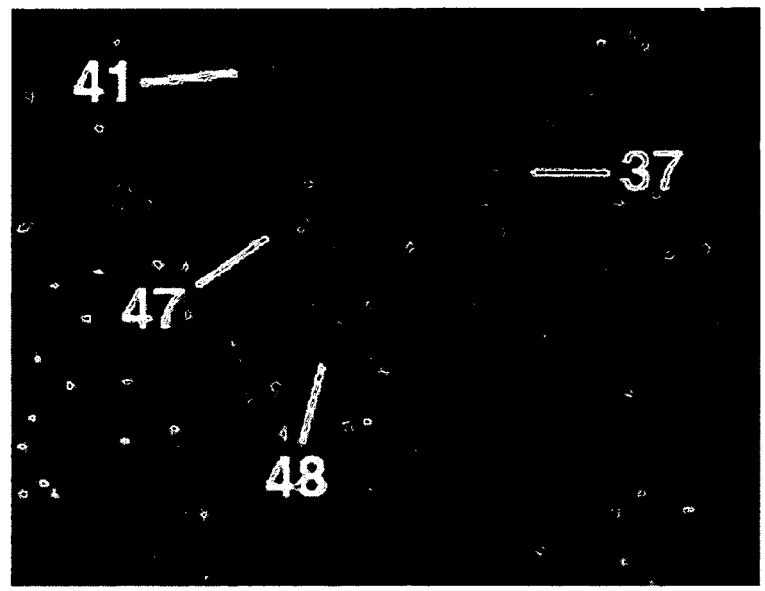
FIG. 4A shows visible and scanning electron microscopy (SEM) images (overlayed) of a section of a nano-optics apparatus synthesized in accordance with the presently disclosed embodiments.
Figure 4B:
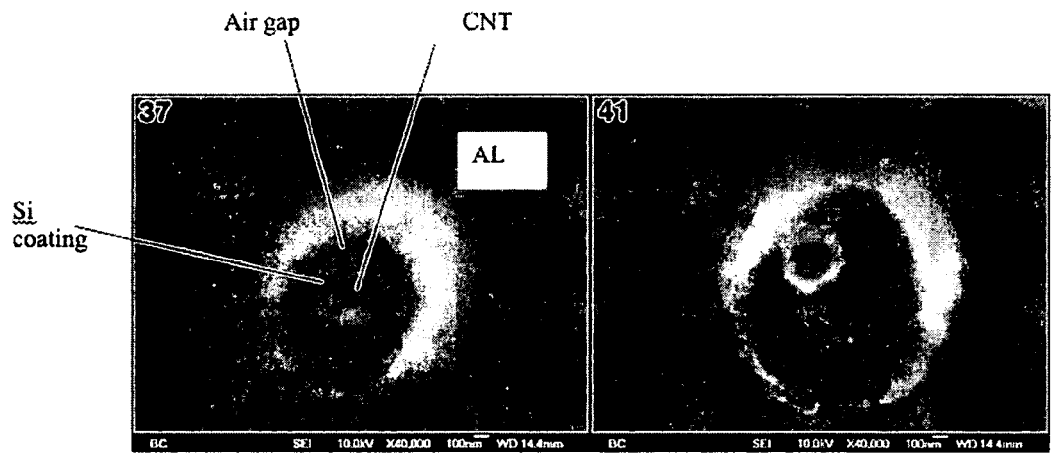
FIG. 4B shows scanning electron microscopy (SEM) images of the nano-optics apparatus of FIG. 4A.

FIG. 4A shows a visible image of a section of a nano-optics apparatus synthesized in accordance with the presently disclosed embodiments. The non-linear optical components have been illuminated from behind with green and red lasers. Both green and red light is guided through the nano-CTLs. Each active nano-CTL is surrounded by a green halo. Smaller red light spots are also visible. FIG. 4B shows the corresponding SEM close-up (top view) of the numbered non-linear optical components. Non-linear optical component number 37 and number 47 are single core, while number 41 and number 48 are double core. Non-linear optical component number 37 consists of a CNT core, coated with Si, located coaxially inside a cylindrical canal penetrating an Al film. An air gap (the dark ring) separates the Si coated CNT from the Al wall. As seen in FIG. 4B, the air gap is much thinner (about 100 nm) than the wavelength of the radiation (about 550 nm for green and about 650 nm for red). Thus, the subwavelength action of the nano-CTL has been demonstrated.

Figure 5A:
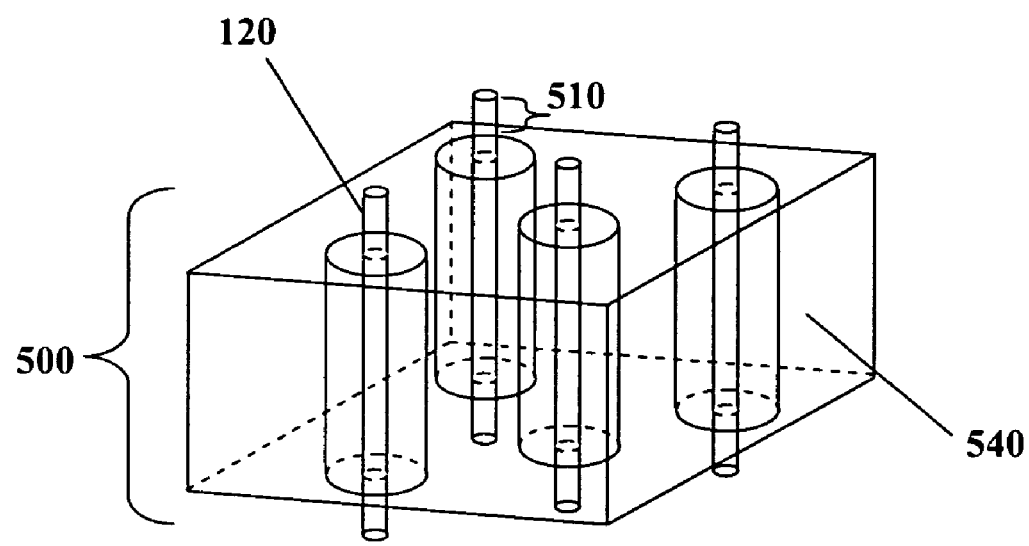
FIG. 5A shows a three-dimensional configuration of an optical switch apparatus synthesized in accordance with the presently disclosed embodiments. The apparatus includes an array of non-linear optical components that have protruding portions that extend beyond a surface of a thin metallic film and an embedded portion that is within the metallic film.

FIG. 5A shows a three-dimensional schematic image of an optical switch apparatus 500 synthesized in accordance with the presently disclosed embodiments. Electron tunneling is triggered by the large electric field between the inner and outer electrodes (conductors) of the apparatus 500, thus acting as a switching mechanism. High field induces tunneling between conductors of the apparatus 500. An optical signal coming from the nano-optical antenna protruding from the bottom surface of the apparatus 500 may produce an electric field inside the nano-CTL thus switching an optical signal coming from the nano-optical antenna protruding from the top surface of the apparatus 500, thus causing the optical switch apparatus 500 to act as an all-optical switch. The switching can be enhanced by filling the interior of the nano-CTL with a light-sensitive semiconducting material that would lower the threshold field for the switching.

Nano-optical antennas 510 extending beyond a metallic film 540 are capable of receiving, transmitting, and re-emitting an optical signal (electromagnetic radiation). The incoming signal, collected by an array of the nano-optical antennas 510, is compressed into nanoscopic channels of the nano-coaxial transmission lines (cables), and is subsequently decompressed (and reemitted) on the opposite side of the film by the nano-optical antenna 510 segments. The nano-optical antennas 510 possess the directional characteristics of conventional antennas, proving that conventional, radio technology applies to the optical switch apparatus 500 in the visible frequency range. The conventional coaxial cables for light may also be developed. The nano-coaxial transmission lines do not have a cut-off frequency (in contrast to waveguides), i.e. the nano-coaxial transmission lines allow for propagation of radiation with wavelength exceeding their perpendicular dimensions. The purpose of using the nano-coaxial transmission lines in the optical switch apparatus 500 is to channel, and compress the external radiation into the confined space between the internal and external electrodes. The degree of this compression can be estimated as follows. A matched antenna collects radiation from an area of the order of $\lambda^2$. Subsequently, this radiation energy can be efficiently transferred into the coaxial transmission line, where it compresses into an area of $\pi(R^2-r^2)$, thus the power compression factor is of the order of $\lambda^2/\pi(R^2-r^2)$. By employing carbon nanotubes with a radius of about 5 nm ($R\approx5$ nm), and using a perpendicular dimension of about 20 nm ($R\approx20$ nm), the power compression factor of the order of several hundreds in the visible range is possible.

The electric field inside the coaxial line varies as $1/\rho$, where $\rho$ is the radial distance from the center, and thus can be made very large for small r. It can be shown, that the electric field enhancement is of the order of $\lambda/\rho$, and thus is of the order of about one hundred in the visible range at the carbon nanotube with $r\approx5$ nm. An additional, dramatic field enhancement can be achieved by using carbon nanotubes with active plasmon resonances in the range of operation, e.g. gold or silver. Calculations show that there is an additional, resonant enhancement by factor as high as $10^4$ due to the plasmon (Mie) resonances. These results explain the giant field enhancements deduced from the Raman experiments. The total field enhancement may be as high as $10^6$ to $10^7$, and therefore high enough to trigger nonlinear processes in the dielectric of the coaxial cable, leading to the desired switching-off the transmitted electromagnetic energy.

Figure 5B:
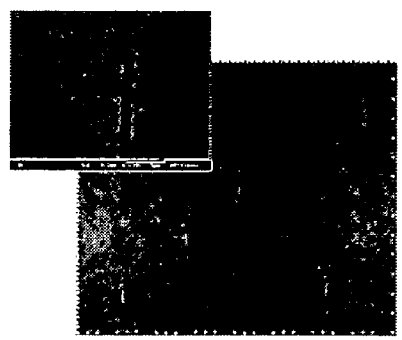
FIG. 5B shows a scanning electron microscopy (SEM) image of the non-linear optical components (carbon nanotubes) used in the optical switch apparatus of FIG. 5A.
Figure 5C:
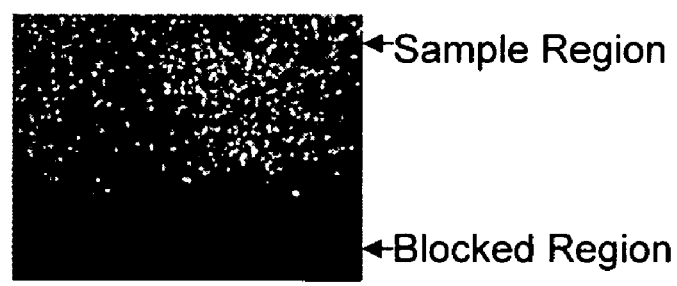
FIG. 5C shows a transmission optical microscope image of the optical switch apparatus of FIG. 5A.

FIG. 5B shows a scanning electron microscopy image of the inner electrodes of the nano-CTL of FIG. 5A. The optical components are aligned linearly in the optical switch apparatus 500. FIG. 5C shows a transmission optical microscopy image of the optical switch apparatus 500 of FIG. 5A. In the optical switch apparatus 500 of FIG. 5A, only the top half of the optical switch apparatus 500 was etched during fabrication, thus exposing the antennas. The bottom portion was not etched. This results in just the top portion having transmitted light (sample region), as seen in the transmission optical microscopy image of FIG. 5C. The bottom portion was not etched, resulting in a blocked region.

Figure 6:
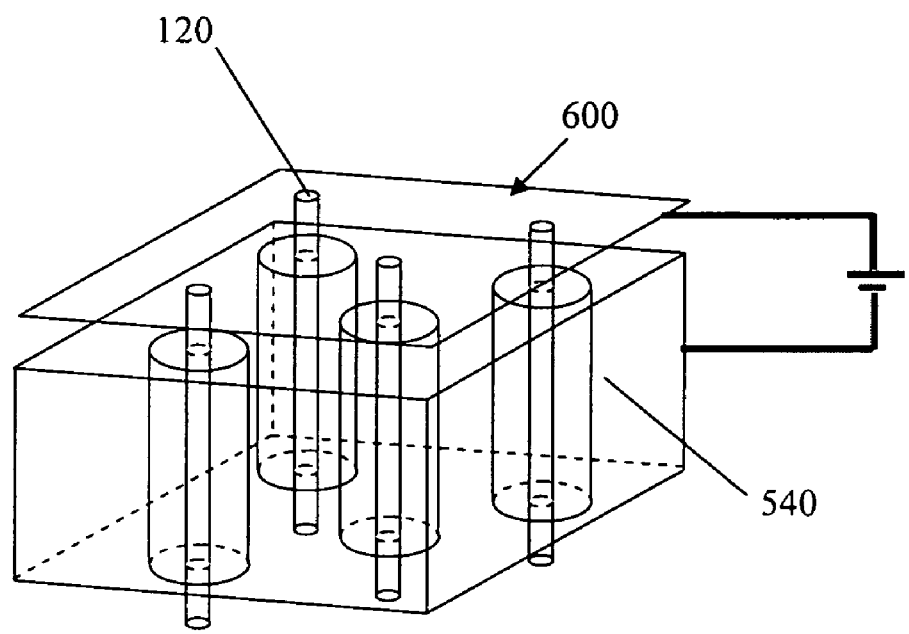
FIG. 6 shows a modified embodiment of the optical switch apparatus of FIG. 5A, with the interior of each non-linear optical component filled with a nonlinear material (semiconductor) that becomes highly conductive under bias (applied between the inner and outer conductors).

FIG. 6 shows a modified embodiment of the optical-switch apparatus of FIG. 5A, with the interior of each switching component filled with a nonlinear field-sensitive medium that becomes highly conductive under bias (applied between the inner conductors and outer conductors). The field sensitive medium includes, but is not limited to, semiconductors, semiconductor p-n junctions, Schottky barriers and similar structures known to those skilled in the art. In an embodiment, the interior of each nano-CTL is filled with a nonlinear field-sensitive medium, such that an optical signal coming from the nano-optical antenna on the bottom surface of the apparatus may produce an electric field inside the nano-CTL thus affecting (switching) an optical signal coming from the nano-optical antenna on the top surface of the apparatus, thus causing the optical switch apparatus to act as an all-optical switch.

A top piece 600 acts as an external electrode. The external electrode 600 may short the inner electrodes of the non-linear optical components and the outer electrode, thus making the array of non-linear optical components experience the same voltage simultaneously. Thus, in this embodiment, switching of all non-linear optical components occurs simultaneously. The increased conductivity quenches the transparency of the nano-CTLs. In FIG. 6, the internal electrodes are connected in parallel and the external electrode is connected in parallel. Applying bias between the sets of electrodes switches off (or on) the non-linear optical components. The optical-switch apparatus shown in FIG. 6 acts as a transparency switch. The transparency switch allows a bias controlled quenching of the transmission.

Figure 7:
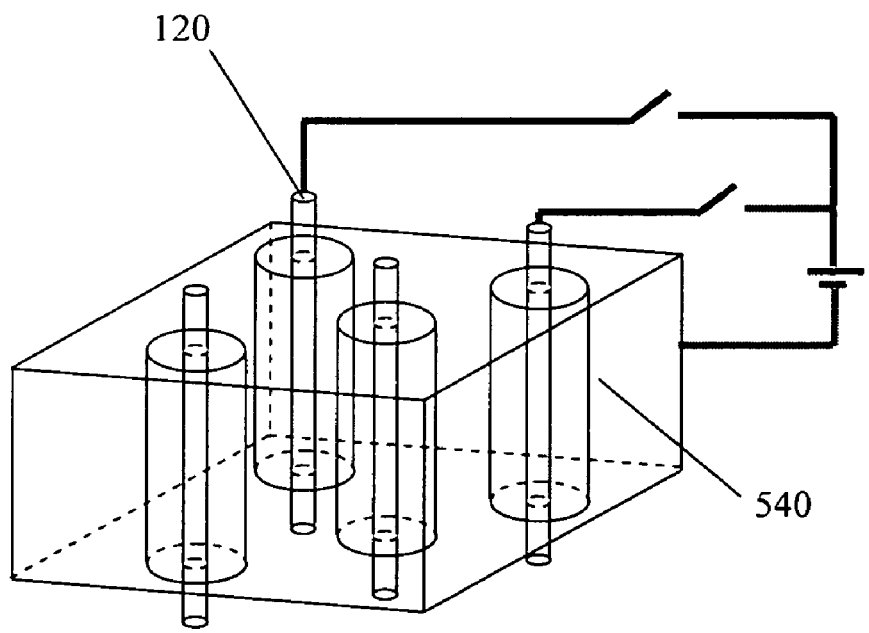
FIG. 7 shows a modified embodiment of the optical switch apparatus of FIG. 5A, in which individual inner electrodes of each non-linear optical component are contacted, thus allowing switching on-off individual carbon nanotube structures.
Figure 8:
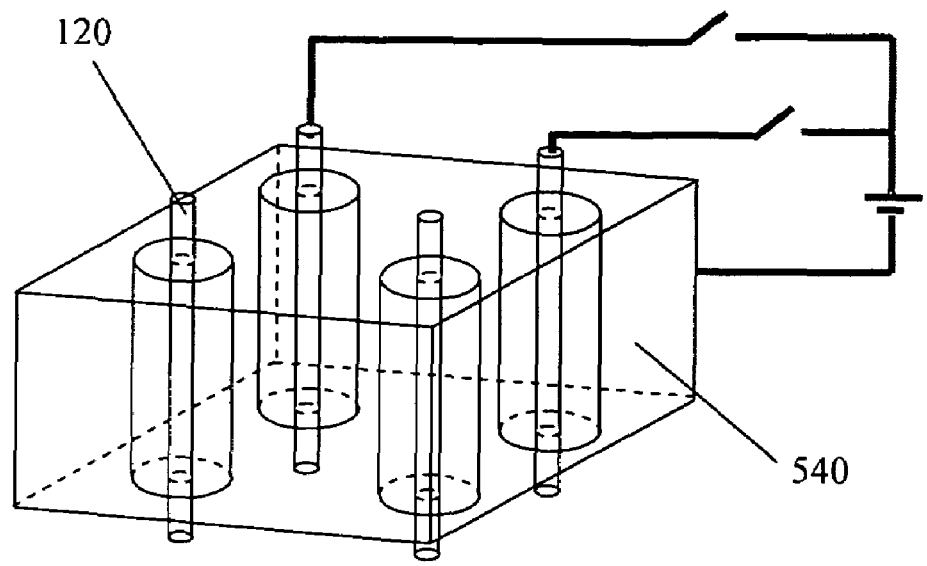
FIG. 8 shows a modified embodiment of the optical switch apparatus of FIG. 5A, in which the non-linear optical components form a periodic lattice. In this embodiment, the non-linear optical component array emits radiation that is highly directional.

FIG. 7 shows a modified embodiment of the optical-switch apparatus of FIG. 5A, in which individual inner electrodes of each non-linear optical component is contacted, thus allowing switching on-off individual carbon nanotube structures FIG. 8 shows a modified embodiment of the optical-switch apparatus of FIG. 5A, in which the array of non-linear optical components form a periodic lattice due to the periodic arrangement of the non-linear optical components. In this embodiment, the array of non-linear optical components emit radiation that is highly directional. The light emitted can be produced by an external source that illuminates one surface (i.e., the top surface) of the apparatus. Switching of the groups of nanocaoxes can be done by using the same mechanism as in FIG. 7. In this embodiment, switching on-off groups of non-linear optical components will change the direction of the highly directional emitted radiation. Thus, the optical-switch apparatus shown in FIG. 8 acts as a bias-controlled light scanner.

Figure 9:
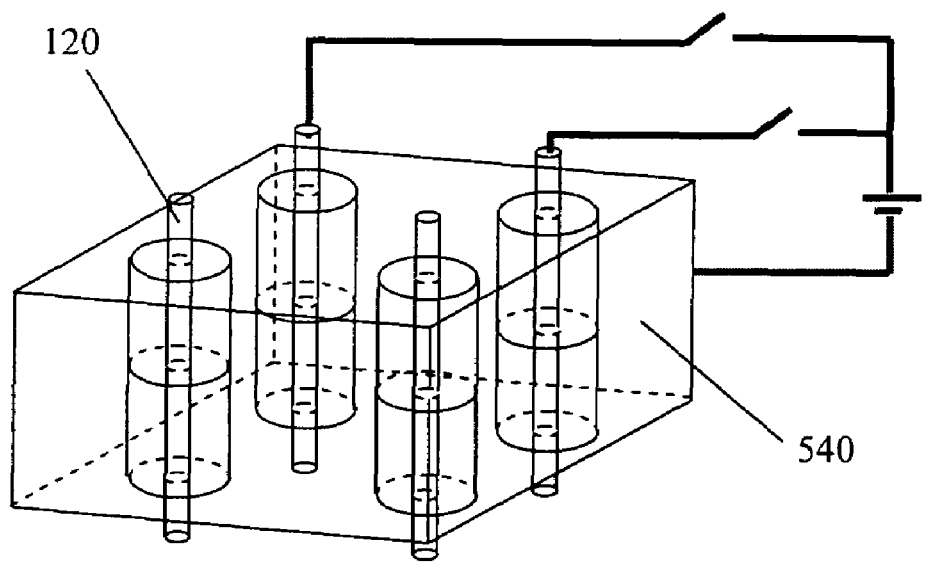
FIG. 9 shows a modified embodiment of the optical switch apparatus of FIG. 5A, resulting in phased arrays.

FIG. 9 shows a modified embodiment of the optical-switch apparatus of FIG. 5A, resulting in phased arrays. Phased array antennas utilize the interference between multiple radiation elements to achieve beam forming and beam steering. By electronically adjusting the signal each antenna radiates, the combined radiation pattern can be scanned and shaped at high speed and have advanced capabilities. In this embodiment, part of each non-linear optical component is filled with a material that changes the dielectric constant under electric bias resulting in delayed transmission through the non-linear optical component. In an embodiment, a portion of each non-linear optical component (about one-half) is filled with the switching semiconductor, and the other portion is filled with a dielectric that produces a time delay. Switching on, or off, individual nano-optical antenna in the array will adjust phases of the radiated emission, thus producing controlled radiation interference, and thus a desired geometrical radiation pattern. The time delay can be controlled by the bias, or by the length of the dielectric.

Figure 10:
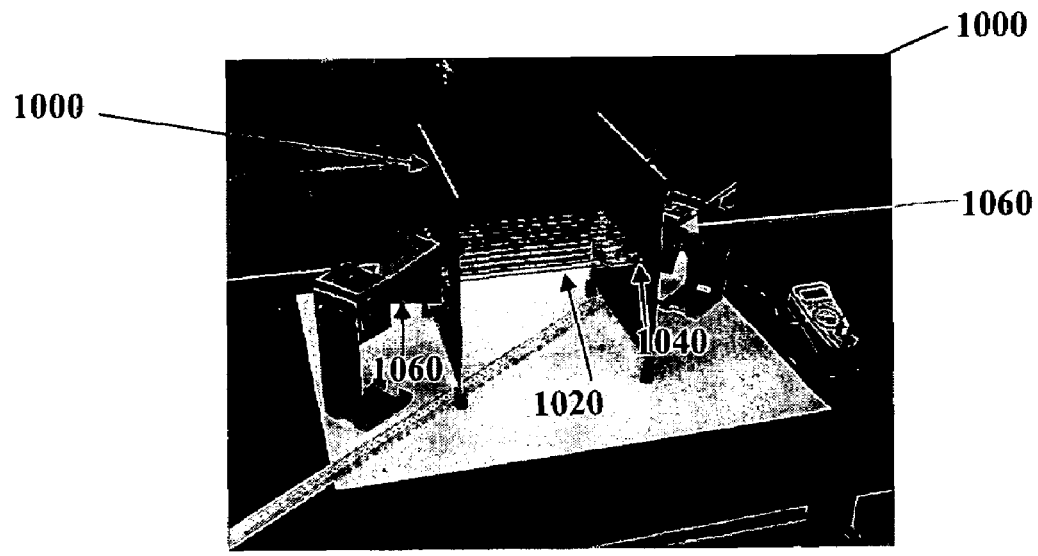
FIG. 10 shows a macroscopic model of the optical switch apparatus of FIG. 5A, and demonstrates transparency in the microwave frequency regime.
Figure 11:
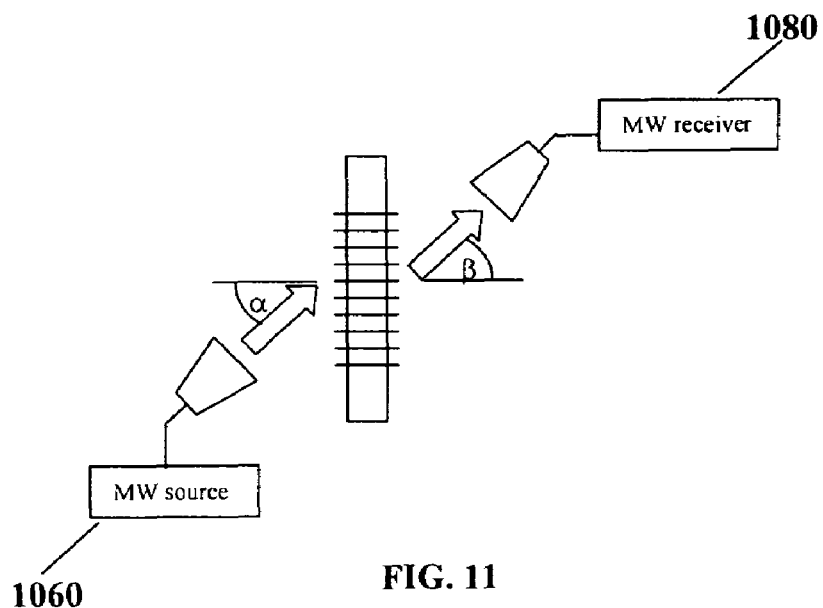
FIG. 11 shows a schematic diagram of the transmission experiment shown in FIG. 10.

FIG. 10 shows a macroscopic model of the optical-switch apparatus 500 of FIG. 5A, and demonstrates transparency in the microwave frequency range. FIG. 10 shows two parallel metal plates 1000 at a distance of about 50 cm apart. In FIG. 10, the metal plates 1000 are aluminum, but other metals and alloys are within the spirit and scope of the presently disclosed embodiments. A linear array of coaxial cable 1020 (coaxes) spans and penetrates the two plates 1000. Half-wavelength antennas 1040 (for example, short copper wires) are placed to extend the inner conductors of each coax beyond the coax. This arrangement simulates the conditions in the optical switch apparatus of FIG. 5A. FIG. 10 also shows a transmitting horn antenna 1060 and a receiving horn antenna 1080 of the microwave system used in the transmission experiment. FIG. 11 shows a schematic diagram of the transmission experiment shown in FIG. 10. The maximum received signal occurs when the transmitting horn antenna 1060 (microwave source) and the receiving horn antenna 1080 (microwave receiver) are parallel, i.e. when the angle $\alpha=\beta$, then a strong signal is received by the microwave receiver. When the incoming radiation was p-polarized, that is when the electric field was parallel to the plane of incidence (the surface of the bench), the received signal was maximum.

A method of fabricating a nano-optics apparatus comprises preparing a plurality of nanorods on a substrate, coating the nanorods with a semiconducting material, and coating the semiconductor with a conducting material. The method yields a metal-semiconductor-metal coaxial structure.

In an embodiment, the plurality of nanorods on the substrate are oriented perpendicular to the substrate. In an embodiment, the plurality of nanorods on the substrate are oriented approximately orthogonal to the substrate. In an embodiment, the plurality of nanorods are not perpendicular to the substrate.

In an embodiment, the nanorods are carbon nanotubes. This embodiment comprises coating a substrate with a catalytic material; growing a plurality of carbon nanotubes as internal cores of nanocoax units on the substrate; oxidizing the substrate; coating the substrate with a semiconducting film; and filling with a metallic medium that wets the semiconducting film of the nanocoax units.

A nano-optics apparatus can be fabricated using the method outlined below or similar methods. A flexible or inflexible substrate such as an aluminum (Al) foil is coated with catalytic material (e.g., Ni) by any suitable technique including but not limited to wet chemical deposition, electro-chemical deposition, CVD, sputtering, evaporation and similar techniques. The processed substrate is used for a catalytic growth of carbon nanotubes. Alternatively, the substrate could be employed as an electrode for electrodeposition of any suitable nanorods as internal conductors and cores of nanocoax units, without the use of the catalytic material. The growth of the carbon nanotubes can be performed by any appropriate technique including CVD or PECVD and similar techniques. After depositing or growing of the nanorods, the remaining exposed surface of the substrate, i.e. the area free of nanorods, can be oxidized to fabricate a dielectric layer between the substrate and the outer conductor. Alternatively, the oxidation step can be skipped. Then, the entire system can be coated with a semiconducting layer by any suitable technique (e.g. CVD, electro-chemical deposition, and similar techniques), and eventually filled or coated with a metallic medium (e.g. tin (Sn) powder). In one embodiment, the metallic medium should be selected and processed to obtain a weak wetting contact between the metallic medium and the outer conductor of the nanocoax, yielding a graded diameter end. The metallic medium can be deposited by any conventional technique, e.g. spraying, painting, spin-coating, CVD, evaporation, sputtering, and similar techniques.

A method of optical switching comprises positioning an optical switch at a node in an optical circuit, wherein the optical switch comprises a metallic film having a plurality of cylindrical channels containing a dielectric material and an array of non-linear optical components penetrating the metallic film through the plurality of cylindrical channels; receiving an optical signal at a portion of each non-linear optical component that protrudes from a top surface of the metallic film; transmitting the optical signal from the portion that protrudes from the top surface of the metallic film to a portion of the non-linear optical component that is embedded within the metallic film such that the optical signal propagates through the non-linear optical component; receiving an optical signal at a portion of each non-linear optical component that protrudes from a bottom surface of the metallic film; transmitting the optical signal from the portion that protrudes from the bottom surface of the metallic film to the non-linear optical component embedded within the metallic film such that the optical signal propagates through the non-linear optical component, wherein the optical signal transmitted from the portion that protrudes from the bottom surface of the metallic film produces an electric field inside the embedded portion of the non-linear optical component that switches the optical signal coming from the portion of each non-linear optical component that protrudes from a top surface of the metallic film.

All patents, patent applications, and published references cited herein are hereby incorporated by reference in their entirety. It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A nano-optics apparatus for use as an optical switch comprising:
    a metallic film having a top surface, a bottom surface and a plurality of cylindrical channels containing a dielectric material wherein the metallic film acts as an outer electrode; and
    an array of non-linear optical components penetrating the metallic film through the plurality of cylindrical channels wherein the array acts as an array of inner electrodes.

2. The nano-optics apparatus of claim 1 wherein each non-linear optical component has a portion that extends beyond the top surface of the metallic film, a portion that is embedded within the metallic film, and a portion that extends beyond the bottom surface of the metallic film.

3. The nano-optics apparatus of claim 2 wherein the portion that extends beyond the top surface of the metallic film and the bottom surface of the metallic film act as nano-optical antennas for receiving, transmitting, and re-emitting an optical signal.

4. The nano-optics apparatus of claim 3 wherein the nano-optical antennas compress the optical signal into nanoscopic dimensions.

5. The nano-optics apparatus of claim 2 wherein the embedded portion acts as a nano-coaxial transmission line for propagation of an optical signal with a wavelength exceeding the perpendicular dimension of the non-linear optical component.

6. The nano-optics apparatus of claim 5 wherein an optical signal coming from a nano-optical antenna protruding from the bottom surface of the metallic film produces an electric field inside the nano-coaxial transmission line that switches an optical signal coming from a nano-optical antenna protruding from the top surface of the metallic film.

7. The nano-optics apparatus of claim 5 wherein the nano-coaxial transmission line compresses the optical signal into a space between the inner electrodes and the outer electrode.

8. The nano-optics apparatus of claim 7 wherein an electric field between the inner electrodes and the outer electrode causes an electron tunneling that acts as a switching mechanism.

9. The nano-optics apparatus of claim 5 wherein the nano-coaxial transmission line has an interior that is filled with a non-linear light-sensitive medium.

10. The nano-optics apparatus of claim 1 wherein the apparatus acts as an all-optical switch.

11. The nab-optics apparatus of claim 1 wherein the array of non-linear optical components is an array of carbon nanotubes.

12. A method of optical switching comprising:
positioning an optical switch at a node in an optical circuit, wherein the optical switch comprises a metallic film having a plurality of cylindrical channels containing a dielectric material and an array of non-linear optical components penetrating the metallic film through the plurality of cylindrical channels;
receiving an optical signal at a portion of each non-linear optical component that protrudes from a top surface of the metallic film;
transmitting the optical signal from the portion that protrudes from the top surface of the metallic film to a portion of the non-linear optical component embedded within the metallic film such that the optical signal propagates through the non-linear optical component;
receiving an optical signal at a portion of each non-linear optical component that protrudes from a bottom surface of the metallic film;
transmitting the optical signal from the portion that protrudes from the bottom surface of the metallic film to the non-linear optical component embedded within the metallic film such that the optical signal propagates through the non-linear optical component,
wherein the optical signal transmitted from the portion that protrudes from the bottom surface of the metallic film produces an electric field inside the embedded portion of the non-linear optical component that switches the optical signal coming from the portion of each non-linear optical component that protrudes from a top surface of the metallic film.

13. The method of claim 12 wherein the portions of the non-linear optical components that protrude from the top surface and the bottom surface of the metallic film compress the optical signal into nanoscopic dimensions.

14. The method of claim 12 wherein the array of non-linear optical components is an array of carbon nanotubes.

15. A nano-optics apparatus for use as an optical switch comprising:
a metallic film having a top surface and a bottom surface; and
an array of non-linear optical components penetrating the metallic film, each of the non-linear optical components including a nano-coaxial transmission line embedded within the metallic film, a nano-optical antenna protruding from the top surface of the metallic film, and a nano-optical antenna protruding from the bottom surface of the metallic film, wherein a switching semiconductor material surrounds a first portion of each nano-coaxial transmission line and a dielectric material surrounds a second portion of each nano-coaxial transmission line.

16. The nano-optics apparatus of claim 15 wherein the dielectric material surrounding the second portion of each nano-coaxial transmission line produces a time delay in transmission of an optical signal.

17. The nano-optics apparatus of claim 16 wherein a length of the dielectric material controls the time delay.

18. The nab-optics apparatus of claim 15 wherein the switching semiconductor material and the dielectric material change a dielectric constant of the non-linear optical component under an applied electric bias.

19. The nano-optics apparatus of claim 18 wherein the apparatus acts as an optical phased array switch.

20. The nano-optics apparatus of claim 19 wherein switching on or off individual nano-optical antenna in the array of non-linear optical components adjusts phases of radiated emission producing a geometrical radiation pattern from the apparatus.

* * * * *

UNITED STATES PATENT AND TRADEMARK OFFICE
CERTIFICATE OF CORRECTION

PATENT NO.         : 7,649,665 B2
APPLICATION NO. : 11/509398
DATED                : January 19, 2010
INVENTOR(S)      : Krzysztof J. Kempa et al.

It is certified that error appears in the above-identified patent and that said Letters Patent is hereby corrected as shown below:

Col. 13, Ln 3, Claim 11, Delete "nab-optics"
                               Insert -- nano-optics --.

Col. 14, Ln 26, Claim 14, Delete "nab optics"
                               Insert -- nano-optics --.

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,649,665 B2  Page 1 of 1
APPLICATION NO. : 11/509398
DATED : January 19, 2010
INVENTOR(S) : Krzysztof J. Kempa et al.

It is certified that error appears in the above-identified patent and that said Letters Patent is hereby corrected as shown below:

Col. 13, Ln 3, Claim 11, Delete "nab-optics"
    Insert -- nano-optics --.

Col. 14, Ln 26, Claim 18, Delete "nab optics"
    Insert -- nano-optics --.

This certificate supersedes the Certificate of Correction issued February 23, 2010.

Signed and Sealed this

Twenty-seventh Day of April, 2010

David J. Kappos
*Director of the United States Patent and Trademark Office*